(12) United States Patent  (10) Patent No.: US 7,561,628 B2
Sung et al. (45) Date of Patent: Jul. 14, 2009

(54) APPARATUS AND METHOD FOR CELL ACQUISITION AND DOWNLINK SYNCHRONIZATION ACQUISITION IN A WIRELESS COMMUNICATION SYSTEM

(75) Inventors: Sang-Hoon Sung, Suwon-si (KR); Chung-Ryul Chang, Seoul (KR); Soon-Young Yoon, Seoul (KR); Jae-Hee Cho, Seoul (KR); In-Seok Hwang, Seoul (KR); Hoon Huh, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 611 days.

(21) Appl. No.: 11/248,739

(22) Filed: Oct. 12, 2005

(65) Prior Publication Data

US 2006/0078040 A1 Apr. 13, 2006

(30) Foreign Application Priority Data

Oct. 12, 2004 (KR) .................. 10-2004-0081313

(51) Int. Cl.
*H04K 1/10* (2006.01)
(52) U.S. Cl. .............. 375/260; 375/259; 375/316; 370/329; 370/328; 370/310; 370/210; 370/203
(58) Field of Classification Search ............ 375/260, 375/259, 316; 370/329, 328, 310, 210, 203
See application file for complete search history.

(56) References Cited

U.S. PATENT DOCUMENTS

| 7,139,320 | B1* | 11/2006 | Singh et al. ............ 375/260 |
| 2002/0054585 | A1* | 5/2002 | Hanada et al. .......... 370/342 |
| 2004/0085946 | A1* | 5/2004 | Morita et al. ........... 370/342 |
| 2004/0095907 | A1* | 5/2004 | Agee et al. ............. 370/334 |
| 2005/0286465 | A1* | 12/2005 | Zhuang ................. 370/329 |

* cited by examiner

*Primary Examiner*—David C Payne
*Assistant Examiner*—Zewdu Kassa
(74) *Attorney, Agent, or Firm*—The Farrell Law Firm, LLP

(57) ABSTRACT

An apparatus and method for cell acquisition and downlink synchronization acquisition in an OFDMA wireless communication system are provided. In an SS apparatus in a broadband wireless communication system, a preamble subcarrier acquirer extracts subcarrier values having a preamble code from an FFT signal. A multiplier code-demodulates the subcarrier values by multiplying the subcarrier values by a preamble code. A correlator calculates a plurality of differential correlations in the code-demodulated signal. An IFFT processor IFFT-processes the differential correlations by mapping the differential correlations to subcarriers. A maximum value detector detects a maximum value from the IFFT signal and calculates a timing offset using an IFFT output index having the maximum value.

20 Claims, 14 Drawing Sheets

APPARATUS AND METHOD FOR CELL ACQUISITION AND DOWNLINK SYNCHRONIZATION ACQUISITION IN A WIRELESS COMMUNICATION SYSTEM

PRIORITY

This application claims priority under 35 U.S.C. § 119 to an application entitled "Apparatus And Method For Cell Acquisition And Downlink Synchronization Acquisition In A Wireless Communication System" filed in the Korean Intellectual Property Office on Oct. 12, 2004 and assigned Serial No. 2004-81313, the contents of which are incorporated herein by reference.

BACKGROUND OF THE INVENTION

1. Field of the Invention

The present invention relates generally to a receiving apparatus and method for a Subscriber Station (SS) in an Orthogonal Frequency Division Multiplexing (OFDM)-based broadband wireless communication system, and in particular, to an apparatus and method for cell acquisition and downlink synchronization acquisition in a Time Division Duplex-Orthogonal Frequency Division Multiple Access (TDD-OFDMA) communication system.

2. Description of the Related Art

In OFDMA communication systems based on the IEEE 802.16d/e standard, an SS identifies a cell and acquires synchronization to the cell using a pilot signal or a preamble signal received from a Base Station (BS). Any signal transmitted from the BS for assisting in cell acquisition and downlink synchronization in the SS is referred to as a "preamble signal". Cell acquisition and synchronization acquisition in IEEE 802.16d/e based systems will be described.

FIG. 1 illustrates the configuration of an OFDMA-based broadband mobile communication system.

Referring to FIG. 1, the OFDMA communication system is configured to have a single cell structure. It is comprised of a BS 100 and a plurality of SSs 110, 120 and 130, each managed by the BS 100. Signal transmission/reception takes place in OFDM/OFDMA between the BS 100 and the SSs 110, 120 and 130. Thus, the SSs 110, 120 and 130 and the BS 100 transmit physical channel signals on subcarriers.

In the OFDMA communication system having the above-described configuration, upon power-on, an SS attempts to access a BS. The SS first acquires synchronization to receive information from the BS. The synchronization is the process of detecting the absolute time of a received signal and acquiring a signal in a desired time period among successively received signals. The synchronization is divided into primary rough synchronization referred to as frame synchronization, and secondary fine synchronization for acquiring accurate timing synchronization. For a wireless connection, the SS performs a cell acquisition in which it estimates information about a BS to transmit the most acceptable signal to the SS, after frame synchronization. Then the SS carries out fine synchronization with the BS to prevent degradation of a received signal from arising from asynchronization.

Once the SS is connected to the BS, the SS transmits/receives data to/from the BS. If the SS roams (i.e. the wave propagation time varies according to the moved distance) or the clock signal from the SS does not trigger and instead drifts, the SS loses the initially acquired downlink timing synchronization. To solve this out-of-synchronization problem, the SS prevents a received signal from being degraded through periodic synchronization (synchronization tracking) while connected to the BS.

Also, if the SS moves away from the BS after the connection, the Signal-to-Noise Ratio (SNR) of a signal received from the BS decreases. That is, as the SS is farther from the BS, path loss increases, causing handoff. The SS then attempts a handoff and tries to access a BS that offers the highest SNR. During this operation, the SS performs synchronization and neighbor cell acquisition. If the cell acquisition and synchronization take place after the handoff is decided, a long time delay occurs until the handoff is completed. The SS must acquire information about neighbor cells (SNR, timing offsets, and cell acquisition) beforehand in preparation for the handoff.

Now a description will be made of how the preamble signal is transmitted.

FIGS. 2A and 2B illustrate the format of a preamble signal used in a typical TDD-OFDMA system. Specifically, FIG. 2A illustrates the preamble signal in the frequency domain and FIG. 2B illustrates the preamble signal in the time domain.

Referring to FIG. 2A, a preamble code is allocated to even-numbered subcarriers. As a result, the preamble signal has a repeated pattern in the time domain as illustrated in FIG. 2B. The preamble code carried on the used subcarriers is unique according to a cell ID. Therefore, correct detection of the preamble code leads to acquisition of the cell ID. Table 1 below summarizes the characteristics of preamble signals proposed in the IEEE 802.16d standards.

TABLE 1

|  | WiBro | IEEE 802.16d |
| --- | --- | --- |
| Non-zero pilot spacing | 2 subcarriers | 3 subcarriers |
| Number of non-zero pilots | 432 | 577 |
| Length in time | 2 OFDMA symbols | 1 OFDMA symbol |
| PAPR | 4.87~6.79 | 4.21~5.14 |
| Number of modulation sequence | 1016 (127 cell IDs × 8 sectors) | 114 |
| Tx power boosting per pilot | 3 dB (identical OFDMA) | 9 dB (4.26 dB higher OFDMA) |

An apparatus for transmitting a preamble with the above characteristics will be described.

FIG. 3 is a block diagram of a preamble transmitter in the typical TDD-OFDMA communication system.

Referring to FIG. 3, a preamble code generator 301 generates a cell-specific preamble code using received cell information (IDcell, s). A preamble channel generator 303 allocates the preamble code to subcarriers, that is, allocates each element or bit of the preamble code to a corresponding input (subcarrier position) of an Inverse Fast Fourier Transform (IFFT) processor 305. As noted from Table 1, in a WiBro system, the preamble channel generator 303 allocates the preamble code to even-numbered subcarriers and pads null (zeroes) at the remaining odd-numbered subcarriers. The IFFT processor 305 generates a time-domain signal by IFFT-processing the signal received from the preamble channel generator 303. A parallel-to-serial converter 307 converts the parallel IFFT data to serial data. A Cyclic Prefix (CP) inserter 309 inserts a CP into the serial data stream, thereby generating a baseband preamble signal. While not shown, the baseband preamble signal is processed into a Radio Frequency (RF) signal transmittable over the air and then transmitted over the air through an antenna.

Initial cell search using the preamble signal will be described below.

FIG. 4 is a block diagram of a cell search apparatus for an SS in a conventional TDD-OFDMA communication system.

Referring to FIG. 4, a serial-to-parallel (S/P) converter 401 parallelizes a received preamble signal (OFDM symbol). A Fast Fourier Transform (FFT) processor 403 FFT-processes the parallel signals and outputs a frequency-domain FFT signal. A differential correlator 405 correlates the FFT signal with all possible preamble codes. To be more specific, the differential correlator 405 multiplies the FFT signal by a preamble code, correlates adjacent subcarriers in the product, sums the correlations, and outputs the sum as a final correlation for a corresponding cell. For example, if there are 127 cell IDs and 8 cells are given per cell, the differential correlator 405 searches 127×8 cells and outputs 127×8 correlations, after power-on in the SS. A maximum value detector 407 selects a preamble code (or cell ID information) with the highest correlation. Since the SS does not have a prior knowledge of a cell at an initial access, it must perform an exhaustive search over all cases to acquire information about a cell in which it is located.

The above-described cell search is modeled as Equation (1):

$$\{IDcell, s\} = argmax_{0 \leq IDcell < 126, 0 \leq s < 8} \{|f_{IDcell,s}|\} \quad (1)$$

$$f_{IDcell,s} = \sum_{j=0}^{W-2} Y_{IDcell,s}(j) \cdot Y^*_{IDcell,s}(j+1)$$

where $f_{IDcell,s}$ denotes an auto-correlation for a cell {IDcell, s}, W denotes the size of an input signal used for auto-correlation, and $Y_{IDcell,s}(j)$ denotes the received signal response of a $j^{th}$ subcarrier among the subcarriers that carry the preamble, after the FFT processing and the preamble code multiplication.

After the cell acquisition, the timing offset of the cell is detected.

The timing offset detection is performed by Equation (2):

$$\tau = argmax_{t_{min} \leq n \leq t_{max}} \left| \sum_{j=0}^{W-1} Y_{IDcell,s}(j) \cdot e^{-j2\pi f(j)n/N_{FFT}} \right| \quad (2)$$

where W denotes the total number of subcarriers that carry the preamble signal, f(j) denotes the actual frequency index of the $j^{th}$ subcarrier among the preamble subcarriers, and $Y_{IDcell,s}(j)$ denotes the received signal response of the $j^{th}$ subcarrier among the preamble subcarriers, after FFT processing and preamble code multiplication.

Referring to Equation (2), $Y_{IDcell,s}(j)$ is a signal input to a timing offset detector. The timing offset detector multiplies the input signal by an exponential function. A variable included in the exponential function is n ranging $[t_{min} \sim t_{max}]$. Thus, Equation (2) is computed over all possible values of n and a particular n that maximizes Equation (2) is selected as a timing offset estimate. $[t_{min} \sim t_{max}]$ is a system operation parameter.

Acquisition of handoff information using the preamble signal will be described now.

FIG. 5 is a block diagram of a neighbor cell acquisition apparatus for the SS in the conventional TDD-OFDMA communication system.

Referring to FIG. 5, an S/P converter 501 parallelizes a received preamble signal (OFDM symbol). An FFT processor 503 FFT-processes the parallel signals and outputs a frequency-domain FFT signal. Typically, a home BS (i.e. serving BS) broadcasts cell information about neighbor BSs to all SSs. Therefore, a differential correlator 505 correlates the FFT signal with each of the known preamble codes of neighbor cells and outputs a plurality of correlations. To be more specific, the differential correlator 505 primarily multiplies the FFT signal by a preamble code, correlates adjacent subcarriers in the product, sums the correlations, and outputs the sum as a final correlation for a corresponding cell. That is, the differential correlator 505 outputs $|f_{IDcell,s}|$ of Equation (1) as a correlation. An arranger 507 arranges the plurality of correlations in a descending order and thus prioritizes the neighbor cells as target cells for handoff.

The above-described neighbor cell search is modeled as Equation (3):

$$\{IDcell,s\} = sort\{|f_{IDcell,s}|\} \quad (3)$$

The timing offset of the acquired neighbor cells are detected according to their priority levels by Equation (4):

$$\tau_{IDcell,s} = argmax_{t_{min} \leq n \leq t_{max}} \left| \sum_{j=0}^{W-1} Y_{IDcell,s} \cdot e^{-j2\pi f(j)n/N_{FFT}} \right| \quad (4)$$

The parameters in Equation (4) and Equation (2) are alike in their definitions.

How synchronization to a home cell is tracked using the preamble signal will be described.

FIG. 6 is a block diagram of a synchronization tracking apparatus for the SS in the conventional TDD-OFDMA communication system.

Referring to FIG. 6, an S/P converter 601 parallelizes a received preamble signal (OFDM symbol). An FFT processor 603 FFT-processes the parallel signals and outputs a frequency-domain FFT signal. A multiplier 605 multiplies the FFT signal by the known preamble code of the home cell. A phase detector 607 multiplies the product received from the multiplier 605 by each of a plurality of exponential functions determined according to a predetermined search range. A maximum value detector 609 selects a signal with the highest value among the output signals of the phase detector 607, and thus acquires the timing offset of the home cell.

The above-described synchronization tracking for the home cell is modeled as Equation (5):

$$\tau = argmax_{t_{min} \leq n \leq t_{max}} \left| \sum_{j=0}^{W-1} Y_{IDcell,s}(j) \cdot e^{-j2\pi f(j)n/N_{FFT}} \right| \quad (5)$$

The parameters shown in Equation (5) and Equation (2) are alike in their definitions.

SUMMARY OF THE INVENTION

As described above, the conventional TDD-OFDMA communication system searches cells and acquires timing offsets as illustrated in FIGS. 4, 5 and 6. However, it has the following shortcomings.

(1) Due to too much computation volume, real implementation is difficult. Table 2 below lists computation volumes for cell acquisition and timing offset acquisition in the conventional technology, especially based on the Korean 2.3 GHz WiBro physical layer standard.

TABLE 2

| Real multiplication | FFT Reception (Radi × 2 FFT) | Code Multiplication Avg. Differential Demod | Phase Scan | Total computation volume |
| --- | --- | --- | --- | --- |
| Initial access | $N_{FFT}\log_2 N_{FFT}$ | 2 × $N_{Code}$ × Code Size × (Code Size − 1) | 2 × Code Size × Search range | 376,237,120 |
| Handoff | $N_{FFT}\log_2 N_{FFT}$ | 2 × $N_{Code}$ × Code Size × (Code Size − 1) | 2 × Code Size × Search range | 3,874,048 |
| Synchronization tracking | $N_{FFT}\log_2 N_{FFT}$ | 2 × $N_{Code}$ × Code Size × (Code Size − 1) | 2 × Code Size × Search range | 1,267,630 |

$N_{FFT}$: FFT size (e.g. 1024)
$N_{Code}$: the number of preamble codes (e.g. 127 × 8)
Code Size: the size of a preamble code sequence (e.g. 432)
Search Range: asynchronous estimation range (e.g. 1024)

(2) The reception performance of a preamble decreases considerably at low SNR. In Equation (2), the subcarrier reception response $Y_{IDcell,s}(j)$ is correlated with signals with different phases, a peak value is detected, and thus a timing offset τ is decided. With low reception performance, the timing offset between subcarrier reception responses leads to incorrect peak detection. In general, many SSs need to operate at low SNR due to inter-cell interference in a cellular system. Consequently, the downlink synchronization acquisition of an SS operating at low SNR or remote from a BS is unreliable, thereby reducing the cell coverage of the BS.

An object of the present invention is to substantially solve at least the above problems and/or disadvantages and to provide at least the advantages below. Accordingly, an object of the present invention is to provide an apparatus and method for reducing a computation volume required for cell search in an OFDM wireless communication system.

Another object of the present invention is to provide an apparatus and method for reducing a computation volume required for downlink synchronization acquisition in an OFDM wireless communication system.

A further object of the present invention is to provide an apparatus and method for reducing a computation volume required for neighbor cell search for handoff in an OFDM wireless communication system.

Still another object of the present invention is to provide an apparatus and method for performing all of the initial cell search, neighbor cell search, and downlink synchronization acquisition by a single hardware configuration in an OFDM wireless communication system.

Yet another object of the present invention is to provide an apparatus and method for increasing preamble detection performance in an OFDM wireless communication system.

Yet further object of the present invention is to provide an apparatus and method for increasing downlink synchronization acquisition performance in an OFDM wireless communication system.

The above objects are achieved by providing an apparatus and method for cell acquisition and downlink synchronization acquisition in an OFDMA wireless communication system.

According to one aspect of the present invention, in an SS apparatus in a broadband wireless communication system, a preamble subcarrier acquirer extracts subcarrier values having a preamble code from an FFT signal. A multiplier code-demodulates the subcarrier values by multiplying the subcarrier values by a predetermined preamble code. A correlator calculates a plurality of differential correlations in the code-demodulated signal. An IFFT processor IFFT-processes the differential correlations by mapping the differential correlations to predetermined subcarriers. A maximum value detector detects a maximum value from the IFFT signal and calculates a timing offset using an IFFT output index having the maximum value.

According to another aspect of the present invention, in a receiving method for an SS in a broadband wireless communication system, subcarrier values having a preamble code are acquired from an FFT signal and code-demodulated by multiplying the subcarrier values by a preamble code. A plurality of differential correlations are calculated from the code-demodulated signal and IFFT-processed by mapping the differential correlations to subcarriers. A maximum value is detected from the IFFT signal and a timing offset is calculated using an IFFT output index having the maximum value.

According to a further aspect of the present invention, in an initial cell search method in a broadband wireless communication system, a first-order differential correlation is performed on signals demodulated with all possible preamble codes and a cell having the highest first-order correlation is acquired. A plurality of differential correlations are calculated by performing an $n^{th}$-order differential correlation on the code-modulated signal of the acquired cell (1 n $n_{max}$) and IFFT-processed by mapping the differential correlations to subcarriers. A maximum value is detected from the IFFT signal and a timing offset is calculated using an IFFT output index having the maximum value.

According to still another aspect of the present invention, in a handoff target cell search method in a broadband wireless communication system, a first-order differential correlation is performed on each of signals demodulated with the preamble codes of known neighbor cells and the neighbor cells are ordered according to the first-order differential correlations. A plurality of differential correlations are calculated by performing an $n^{th}$-order differential correlation on each of the code-modulated signals of the neighbor cells ($1 \leq n \leq n_{max}$) and IFFT-processed by mapping the differential correlations to subcarriers for each neighbor cell. A maximum value is detected from the IFFT signal of the each neighbor cell and a timing offset is calculated using an IFFT output index having the maximum value, for each neighbor cell.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a method of reducing computation volume required for cell search and synchronization tracking, and improving preamble detection performance at low SNR in an OFDMA communication system. In the OFDMA communication system, an SS identifies a cell and acquires downlink synchronization using a signal such as a pilot or a preamble.

The present invention as described below is applicable to any OFDMA system that identifies a cell and acquires downlink synchronization using a signal such as a pilot or a preamble.

Figure 1:
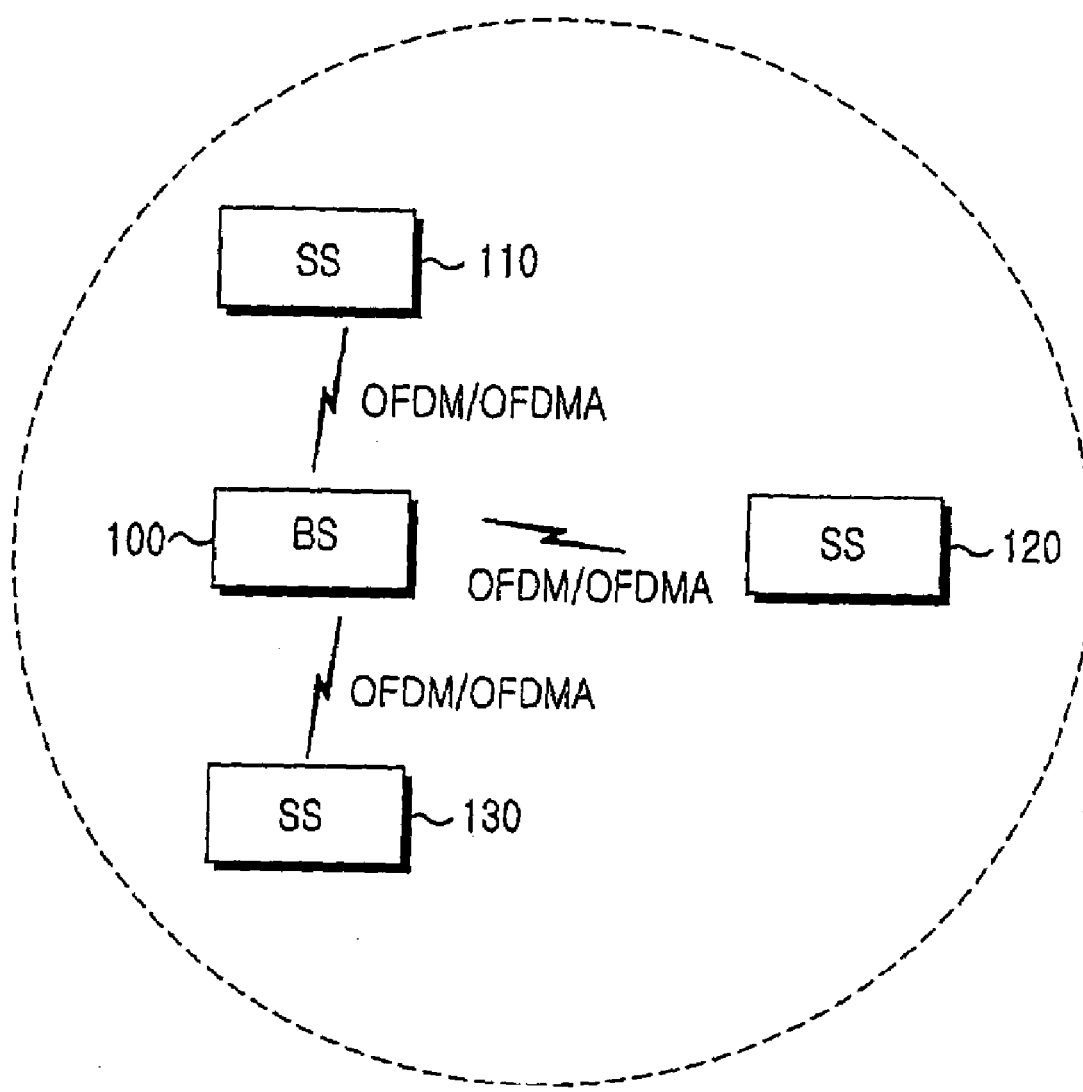
FIG. 1 illustrates the configuration of an OFDMA-based broadband wireless communication system.
Figure 2A:
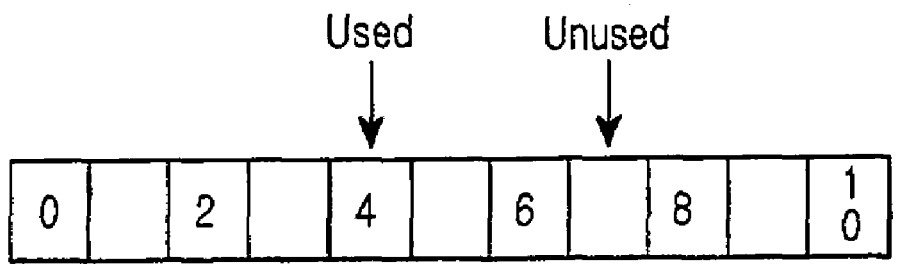
FIGS. 2A and 2B illustrate the format of a preamble signal in a typical TFF/OFDMA communication system.
Figure 2B:
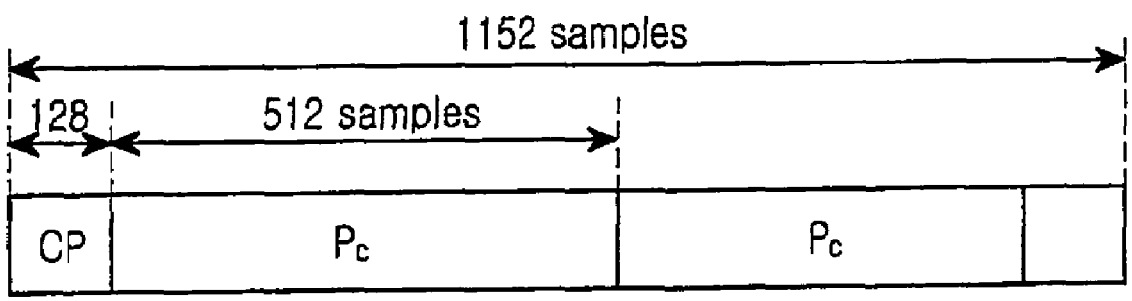
Figure 3:
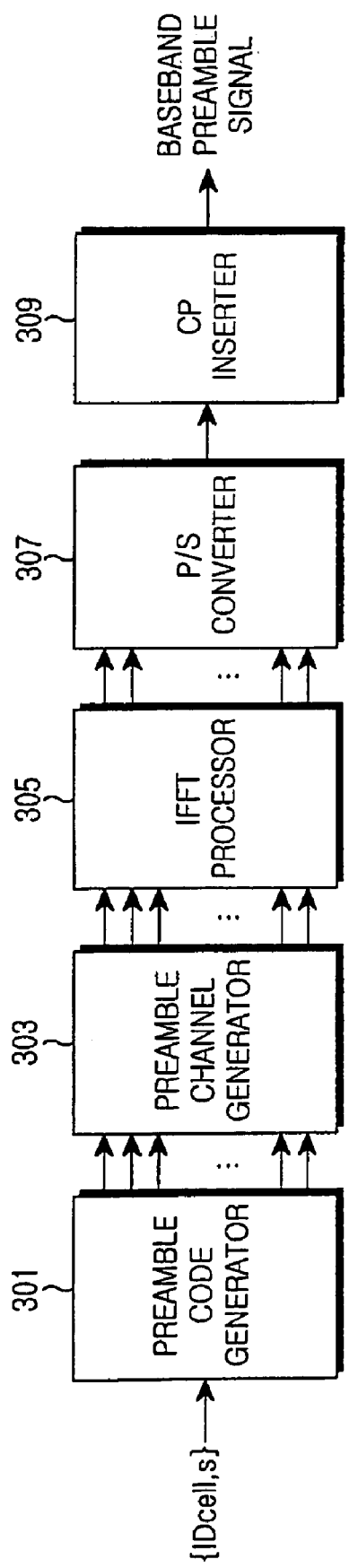
FIG. 3 is a block diagram of a preamble transmitter in the TDD-OFDMA communication system.
Figure 4:
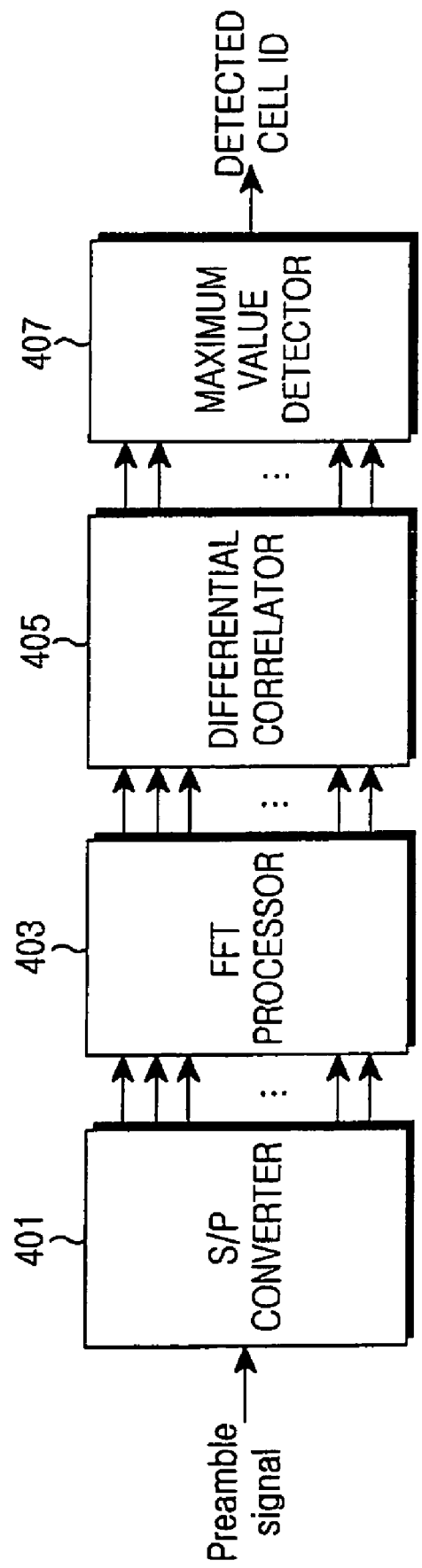
FIG. 4 is a block diagram of a cell search apparatus for an SS in a conventional TDD-OFDMA communication system.
Figure 5:
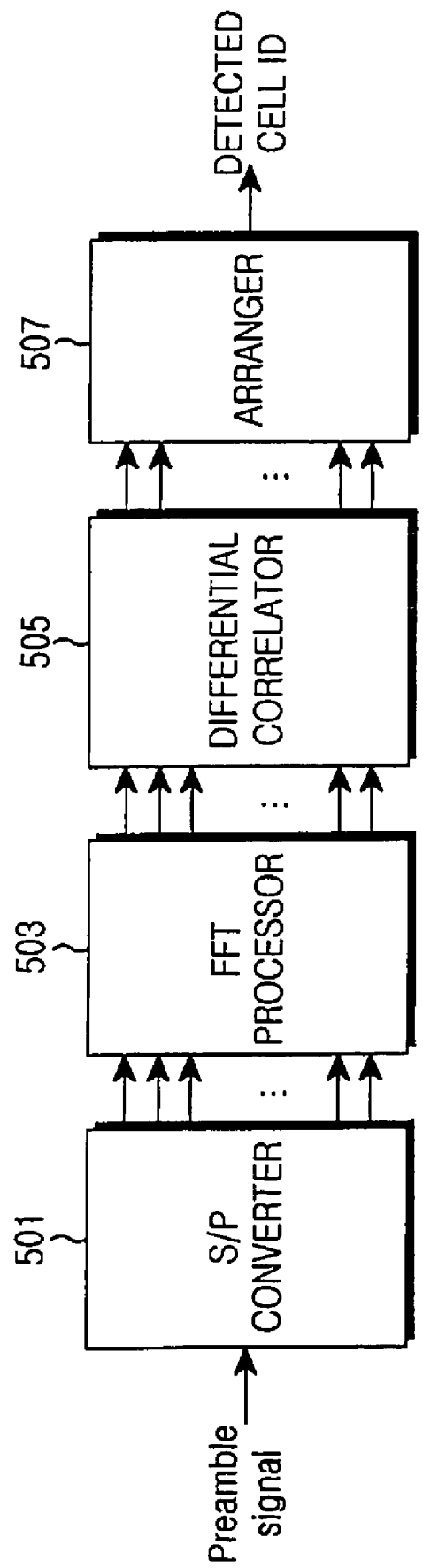
FIG. 5 is a block diagram of a neighbor cell acquisition apparatus for the SS in the conventional TDD-OFDMA communication system.
Figure 6:
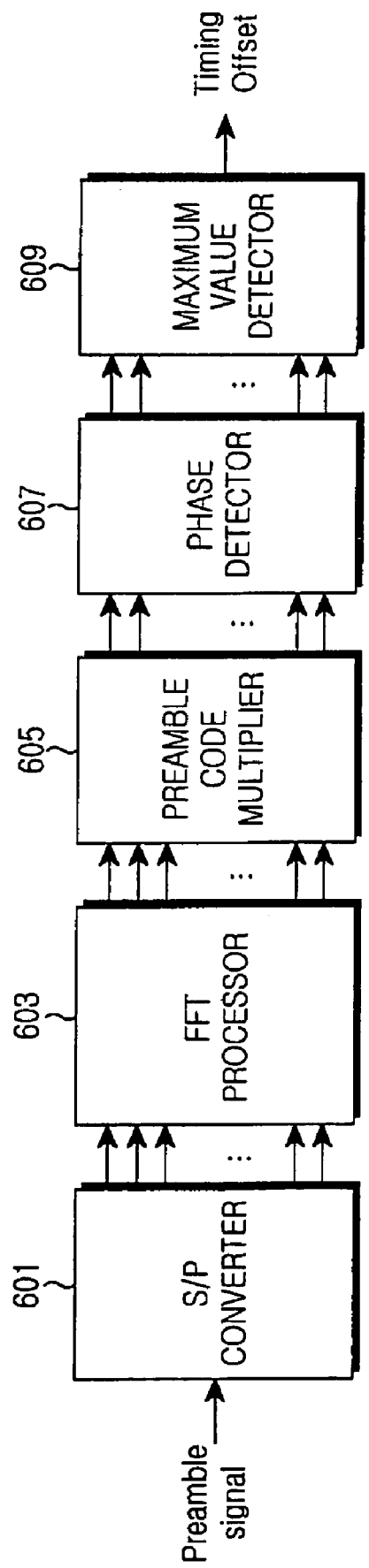
FIG. 6 is a block diagram of a synchronization tracking apparatus for the SS in the conventional TDD-OFDMA communication system.
Figure 7:
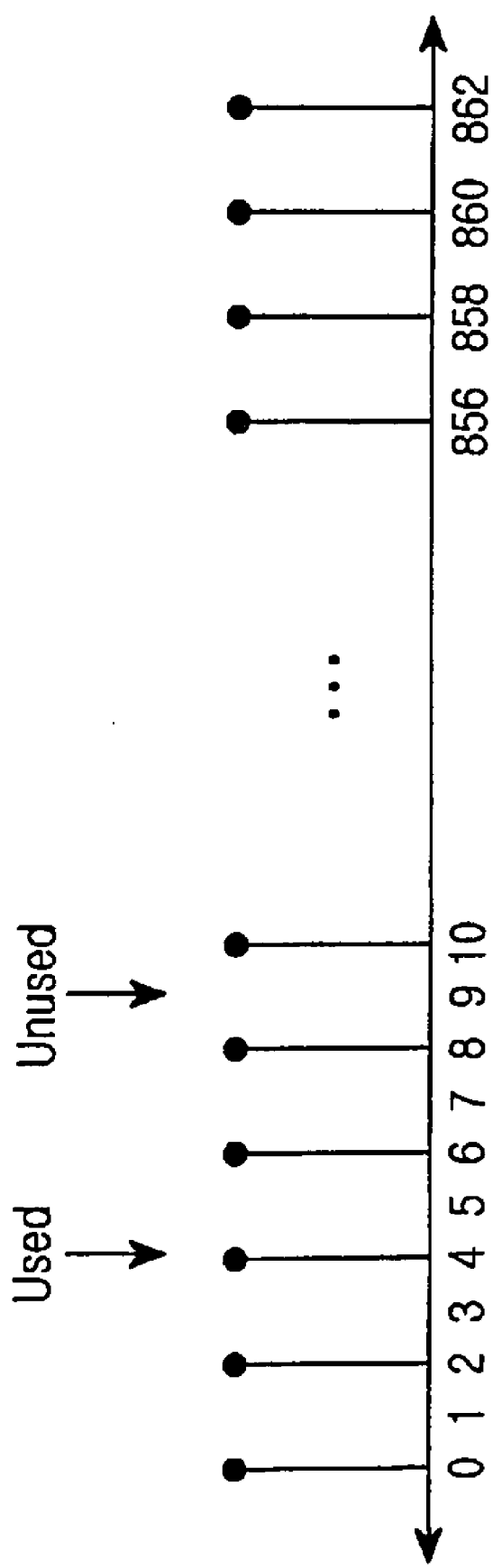
FIG. 7 illustrates an exemplary configuration of downlink preamble subcarriers.

A description will first be made of the configuration of downlink preamble subcarriers. FIG. 7 illustrates an example of downlink preamble subcarriers.

Referring to FIG. 7, the length of a preamble code is 432 and the elements (bits) of the preamble code are mapped to even-numbered subcarriers in a total frequency band. After IFFT, the preamble code is converted to a time-domain signal in which the same signal occurs twice. The preamble code carried on the used subcarriers is unique according to cell identification information (IDcell, s). Therefore, if the SS detects the preamble code correctly, it acquires the cell identification information.

Initial cell search using the preamble signal will be described below.

Figure 8:
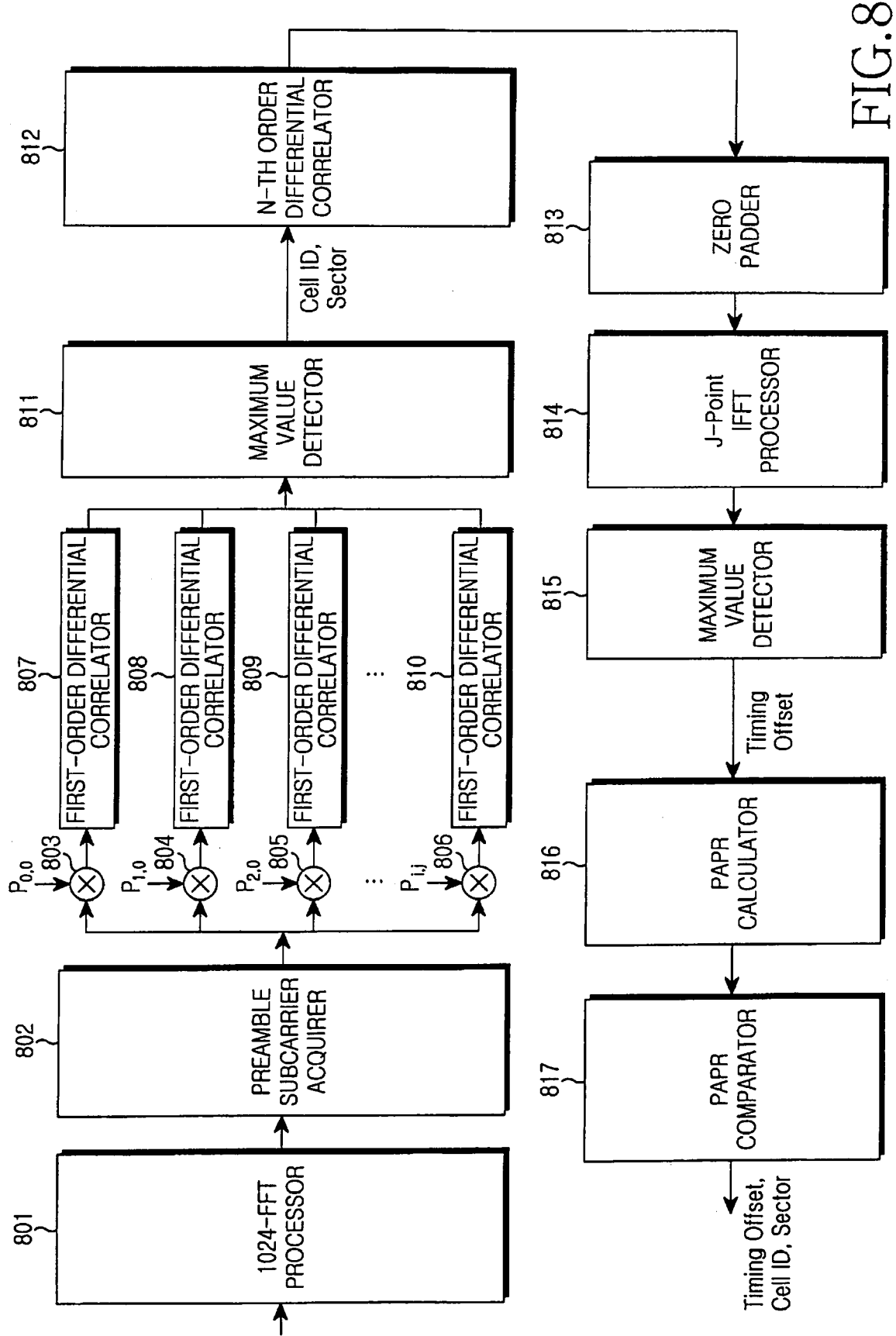
FIG. 8 is a block diagram of a cell search apparatus for an SS in a TDD-OFDMA communication system according to an embodiment of the present invention.

FIG. 8 is a block diagram of an initial cell search apparatus for an SS in a TDD-OFDMA communication system according to an embodiment of the present invention.

The initial cell search apparatus of the present invention includes an FFT processor 801, a preamble subcarrier acquirer 802, multipliers 803 to 806, a first-order differential correlators 807 to 810, a maximum value detector 811, an $N^{th}$-order differential correlator 812, a zero padder 813, an IFFT processor 814, a maximum value detector 815, a PAPR calculator 816, and a PAPR comparator 817.

Referring to FIG. 8, the FFT processor 801 FFT-processes a received preamble signal, that is, it demodulates the received preamble signal into subcarrier values. The preamble subcarrier acquirer 802 acquires subcarrier values having a preamble code among the subcarrier values. The multiplier 803 multiplies the acquired subcarriers by a first preamble code $P_{0,0}$. The multiplier 804 multiplies the acquired subcarriers by a second preamble code $P_{1,0}$. In the same manner, the multiplier 806 multiplies the acquired subcarriers by an $N^{th}$ preamble code $P_{i,j}$. In this way, the subcarrier values with the preamble signal are multiplied by all possible preamble codes, for code demodulation. The sequence output from each of the multipliers 803 to 806 is assumed to have a length of 432. The operation of these multipliers 803 to 806 is modeled as Equation (6):

$$Y_{IDcell,s}(k_j) = R(k_j) P_{IDcell,s}(k_j) \qquad (6)$$

where $k_j$ denotes the index of a subcarrier to which a $j^{th}$ preamble code bit is mapped, R(n) denotes the reception response of an $n^{th}$ subcarrier, $P_{i,j}(n)$ denotes a bit of a preamble code for IDcell=I and sector=j, mapped to the $n^{th}$ subcarrier.

The first-order differential correlator 807 calculates differential correlations between two adjacent subcarriers over all possible cases in the product received from the multiplier 803. Since the preamble code length is 432, the first-order differential correlator 807 outputs a total of 431 differential correlations, sums them, and provides the sum to the maximum value detector 811. Similarly, the first-order differential correlator 810 calculates differential correlations between two adjacent subcarriers over all possible cases in the product received from the multiplier 806, sums them, and provides the sum to the maximum value detector 811. The differential correlation operation is performed by Equation (7):

$$f_{IDcell,s} = \sum_{j=0}^{W-2} Y_{IDcell,s}(k_j) \cdot Y^*_{IDcell,s}(k_{j+1}) \qquad (7)$$

where W denotes the window size of the first-order differential correlators. As noted from Equation (7), the summation of the correlations between all pairs of adjacent subcarriers results in a correlation free of the effects of the timing offset between the subcarriers. Given 127×8 cells to be searched, the maximum value detector 811 receives 127×8 correlations.

The maximum value detector 811 detects a cell (IDcell, s) having the highest absolute correlation among the correlations received from the first-order differential correlators 807 to 811 by Equation (8):

$$\{IDcell_{tmp}, s_{tmp}\} = \arg\max_{0 \leq IDcell \leq 127, 0 \leq s \leq 8} \{|f_{IDcell,s}|\} \quad (8)$$

The $N^{th}$-order differential correlator 812 produces $n_{max}$ correlations by performing an $n^{th}$-order correlation on the preamble code-multiplied value $Y_{IDcell_{tmp}, s_{tmp}}$ for the cell $IDcell_{tmp}, s_{tmp}$ detected by the maximum value detector 811, and outputs the $n_{max}$ correlations and their complex conjugates. Here, 1 n $n_{max}$. Each of the correlations $Z_n$ from the $N^{th}$-order differential correlator 812 is the sum of differential correlations between all pairs of subcarriers spaced by n, containing a phase rotation component as large as the timing offset generated on the downlink. The operation of the $N^{th}$-order differential correlator 812 is modeled as Equation (9):

$$Z_n = \begin{cases} f_{IDcell,s}, & n = 1 \\ \sum_{j=0}^{W-1-n} Y_{IDcell,s}(k_j) \cdot Y^*_{IDcell,s}(k_{j+n}), & 2 \leq n \leq n_{max} \\ Z^*_{J-n}, & J - n_{max} \leq n < J \end{cases} \quad (9)$$

where n denotes a J-point IFFT input index. $n_{max}$ is set according to the coherence bandwidth of a channel and must be less than J/2.

The zero padder 813 provides the $2 \times n_{max}$ correlations to corresponding inputs of the J-point IFFT 814, while padding zeroes at IFFT inputs to which the correlations are not mapped. For $n_{max}=24$, subcarrier positions $Z_n$ padded with zeroes are shown in Equation (10):

$$Z_n = 0, n = 0, 24 \leq n \leq j - 24 \quad (10)$$

The J-point IFFT processor 814 IFFT-processes the signal received form the zero padder 813 and outputs a time-domain IFFT signal. According to the present invention, the IFFT size J can be selected. J can be $$J \in \{2^3, 2^4, 2^5, \ldots, N_{FFT}\}$$

Figure 14:
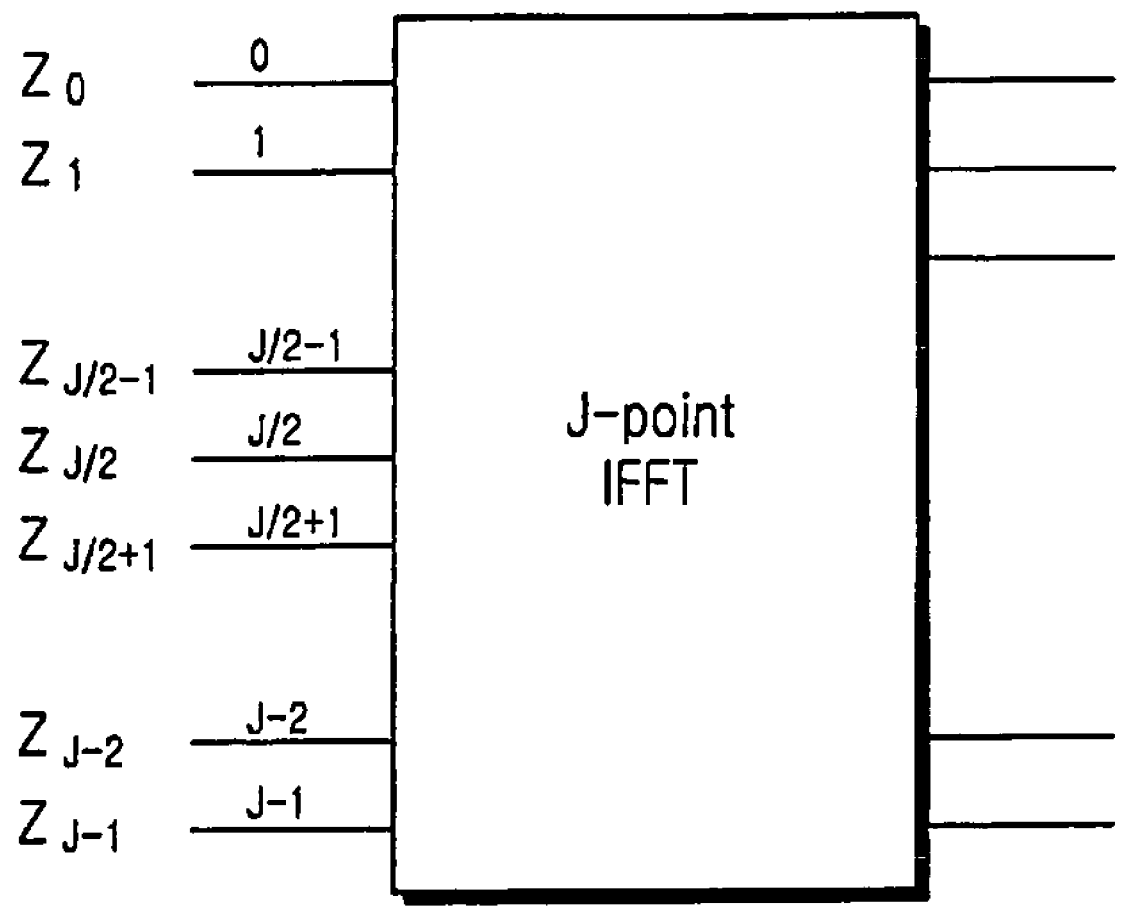
FIG. 14 illustrates J-point IFFT inputs according to the present invention.

As illustrated in FIG. 14, the inputs of a J-point IFFT processor according to the present invention are $\{Z_0, Z_1, \ldots, Z_{J/2-1}, Z_{J/2}, Z_{J/2+1}, \ldots, Z_{J-2}, Z_{J-1}\}$.

The IFFT signal $Z_k$ is the square of a sinc function in accordance with the waveform of the input signal $Z_n$, and characteristically has a shifted maximum value due to the timing offset generated on the downlink.

Therefore, the maximum value detector 815 detects a maximum value from the IFFT signal (sinc function) and calculates a timing offset using an IFFT output index having the maximum value.

The operations of the J-point IFFT processor 814 and the maximum value detector 815 are modeled as Equation (11):

$$Z_k = IFFT_{J-point}\{Z_n\} \quad (11)$$

$$k = \arg\max_{0 \leq k \leq J-1} \{|Z_k|^2\}$$

$$\Delta t_{offset} = \begin{cases} DR \times k \times \frac{1}{d}, & \text{if } k \leq \frac{j}{2} \\ DR \times k \times \frac{1}{d} - N_{FFT}, & \text{if } k > \frac{j}{2} \end{cases}$$

-continued where $$DR(\text{decimation ratio}) = \frac{N_{FFT}}{J}$$

d: subcarrier space between adjacent used subcarriers

To verify the timing offset from the maximum value detector 815, the PAPR calculator 816 calculates a PAPR by Equation (12):

$$PAPR = \frac{\max\{|IFFT(Z_n)|^2\}}{\text{average }\{|IFFT(Z_n)|^2\}} \quad (12)$$

The PAPR comparator 817 compares the PAPR with a threshold. If the PAPR is equal to or greater than the threshold, temporary values $\{IDcell_{tmp}, s_{tmp}, \Delta t_{offset}\}$ are decided as final estimates. The PAPR comparator 817 operates according to Equation (13):

$$\{IDcell_{final}, s_{final}, \Delta t_{offset,final}\} = \quad (13)$$
$$\begin{cases} \{IDcell_{tmp}, s_{tmp}, \Delta t_{offset}\}, & \text{if } PAPR \geq \text{threshold} \\ N/A, & \text{others} \end{cases}$$

where threshold: the specific value assigned to BS

Figure 9:
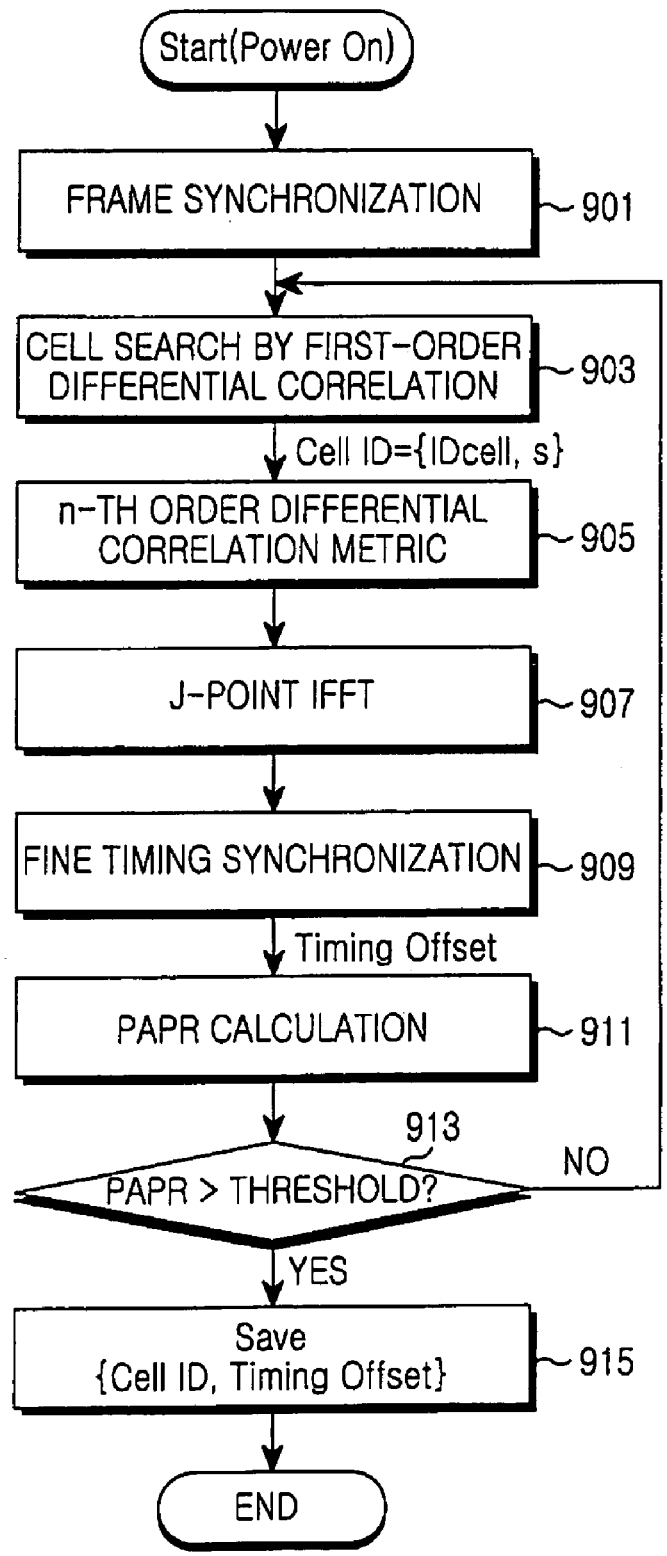
FIG. 9 is a flowchart illustrating an initial cell search procedure for the SS in the TDD-OFDMA communication system according to an embodiment of the present invention.

FIG. 9 is a flowchart illustrating an initial cell search procedure for the SS in the TDD-OFDMA communication system according to an embodiment of the present invention.

Referring to FIG. 9, the SS acquires frame synchronization in step 901. In step 903, the SS demodulates a received preamble signal to subcarrier values by FFT and multiplies the subcarrier values by all possible preamble codes. Under the above assumption, 127×8 sequences of length 432 can be obtained.

In step 905, the SS calculates the differential correlation between two adjacent subcarriers over all cases in each of the 127×8 sequences and sums the differential correlations, thus producing correlations for all possible cells (IDcell, s). The SS compares the 127×8 correlations and acquires a cell (IDcell$_{tmp}$, s$_{tmp}$) having the highest correlation.

The SS calculates $n_{max}$ correlations by performing an $n^{th}$-order differential correlation (1 n $n_{max}$) on the preamble code-multiplied value for the cell (IDcell$_{tmp}$, s$_{tmp}$), and complex-conjugates the $n_{max}$ correlations, resulting in $2 \times n_{max}$ correlations. Each of the $n^{th}$-order correlations is the sum of the correlations between all pairs of subcarriers spaced by n, containing a phase rotation component as large as a timing offset generated on the downlink.

In step 907, the SS performs a J-point IFFT on the $2 \times n_{max}$ correlations. $n_{max}$ is roughly set according to the coherence bandwidth of a channel and it must be less than J/2. The IFFT size, J is a system operation parameter.

Since the resulting IFFT signal is a sinc function, the SS detects a maximum value from the IFFT signal and calculates a timing offset using an IFFT output index having the maximum value in step 909.

The SS calculates the PAPR of the IFFT signal in step 911 and compares the PAPR with a threshold in step 913. If the PAPR is less than the threshold, the SS returns to step 903 to repeat the cell search. If the PAPR is greater than the threshold, the SS sets the cell information (IDcell$_{tmp}$, s$_{tmp}$) acquired in step 903 as a final cell and the timing offset acquired in step 909 as a final timing offset estimate in step 915.

Acquisition of handoff information using the preamble signal will be addressed now.

Figure 10:
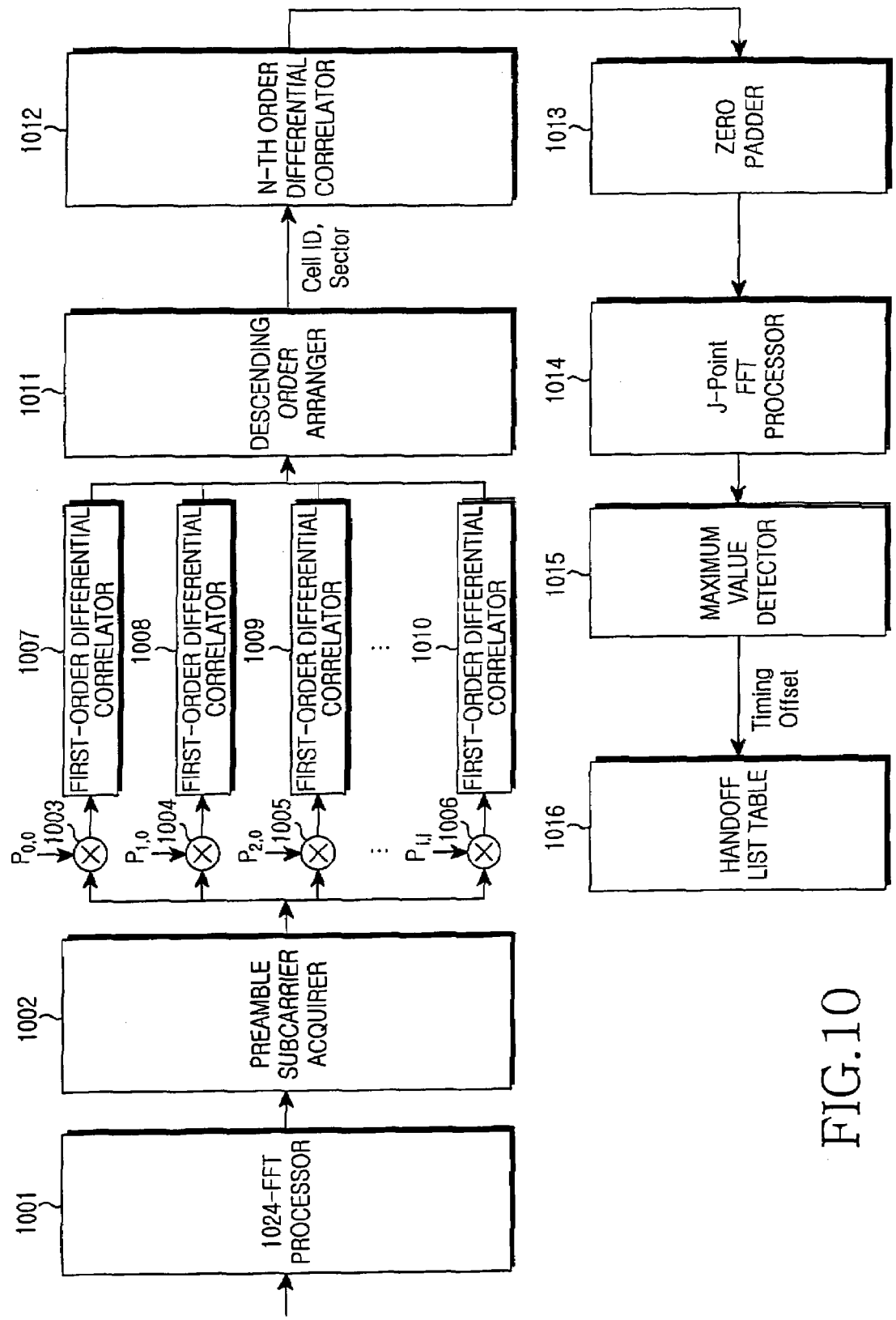
FIG. 10 is a block diagram of a neighbor cell acquisition apparatus for the SS in the TDD-OFDMA communication system according to an embodiment of the present invention.

FIG. 10 is a block diagram of a neighbor cell acquisition apparatus for the SS in the TDD-OFDMA communication system according to an embodiment of the present invention.

Referring to FIG. 10, the neighbor cell acquisition apparatus for handoff according to the present invention includes an FFT processor 1001, a preamble subcarrier acquirer 1002, multipliers 1003 to 1006, a first-order differential correlators 1007 to 1010, a descending-order arranger 1011, an N$^{th}$-order differential correlator 1012, a zero padder 1013, an IFFT processor 1014, a maximum value detector 1015, and a handoff list table 1016.

Referring to FIG. 10, the FFT processor 1001 FFT-processes a received preamble signal, that is, demodulates the received preamble signal to subcarrier values. The preamble subcarrier acquirer 1002 acquires subcarrier values having a preamble code among the subcarrier values.

Each of the multipliers 1003 to 1006 multiplies the acquired subcarriers by a preamble code. Notably, only multipliers to which the preamble codes of known handoff target cells operate. Typically, a home BS broadcasts cell information about neighbor BSs to all SSs. Therefore, the SSs can acquire the cell information of the neighbor BSs without any additional procedure, once they are connected to the BS. The multipliers 1003 to 1006 operate according to Equation (6).

Each of the first-order differential correlators 1007 to 1010 calculates differential correlations between two adjacent subcarriers over all possible cases in the product received from a corresponding multiplier and sums the differential correlations. Since the preamble code length is assumed to be 432, the first-order differential correlator outputs a total of 431 differential correlations, sums them, and provides the sum to the descending-order arranger 1011. Here, only the differential correlators operate which receive signals from multipliers. These differential correlators 1007 to 101 operate by Equation (7).

The descending-order arranger 1011 arranges the correlations received from the first-order correlators 1007 to 1010 in a descending order of absolute correlation values by Equation (14):

$$\{IDcell,s\}=sort\{|f_{IDcell,s}|\} \quad (14)$$

For each of the preamble code-demodulated signals of the arranged cells, the N$^{th}$-order differential correlator 1012 produces n$_{max}$ correlations by and outputs the n$_{max}$ correlations and their complex conjugates. Here, $1 \leq n \leq n_{max}$. Each of the correlations $Z_n$ from the N$^{th}$-order differential correlator 1012 is the sum of differential correlations between all pairs of subcarriers spaced by n, containing a phase rotation component as large as the timing offset generated on the downlink. The operation of the N$^{th}$-order differential correlator 1012 is modeled as Equation (9).

The zero padder 1013 provides the 2×n$_{max}$ correlations to corresponding inputs of the J-point IFFT 814, while padding zeroes at IFFT inputs to which the correlations are not mapped. n$_{max}$ is roughly set according to the coherence bandwidth of the channel. Since differential correlation is not correct for a value exceeding n$_{max}$, corresponding J-point IFFT inputs are padded with zeroes. For n$_{max}$=24, subcarrier positions $Z_n$ padded with zeroes are determined by Equation (10).

The J-point IFFT processor 1014 IFFT-processes the signal received form the zero padder 1013 and outputs a time-domain IFFT signal. According to the present invention, the IFFT size, J, can be selected. J can be $$J \in \{2^3, 2^4, 2^5, \ldots, N_{FFT}\}$$

As illustrated in FIG. 14 and as stated earlier, the inputs of a J-point IFFT processor according to the present invention are $\{Z_0, Z_1, \ldots, Z_{J/2-1}, Z_{J/2}, Z_{J/2+1}, \ldots, Z_{J-2}, Z_{J-1}\}$. The IFFT signal is the square of a sinc function in accordance with the waveform of the input signal $Z_n$, and characteristically has a shifted maximum value due to the timing offset generated on the downlink.

Therefore, the maximum value detector 1015 detects a maximum value from the IFFT signal (sinc function), calculates a timing offset using an IFFT output index having the maximum value, and stores the timing offset and cell information (IDcell, s) corresponding to the timing offset in the handoff list table 1016. The timing offset is calculated by Equation (11).

The operations of the N$^{th}$-order differential correlator 1012 and the maximum value detector 1015 are repeated until the timing offsets of the neighbor cells acquired by the descending-order arranger 1011. The timing offsets are stored together with cell information (IDcell, s) in the handoff list table 1016.

Figure 11:
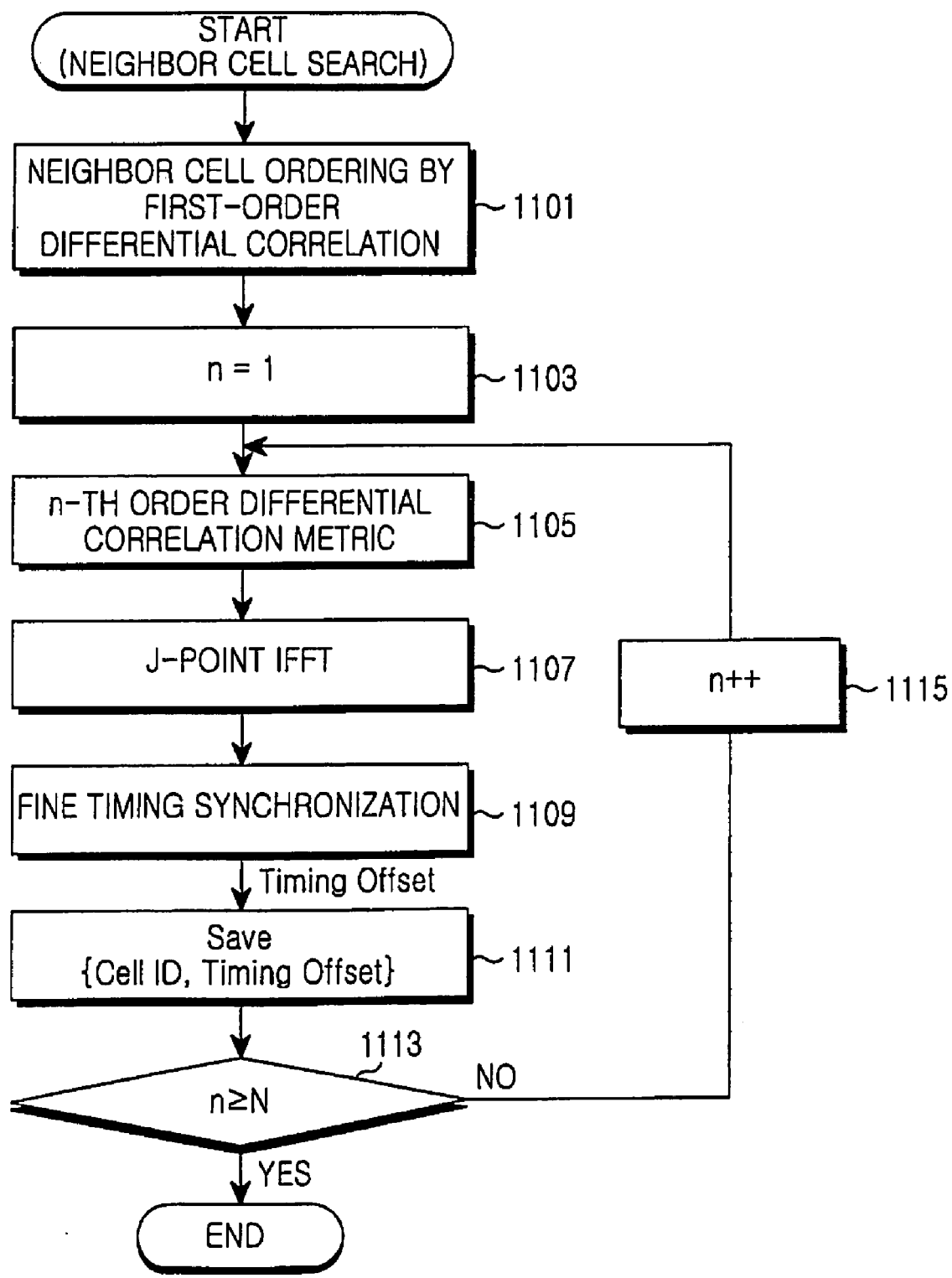
FIG. 11 is a flowchart illustrating a neighbor cell acquisition procedure for the SS in the TDD-OFDMA communication system according to the embodiment of the present invention.

FIG. 11 is a flowchart illustrating a neighbor cell acquisition procedure for the SS in the TDD-OFDMA communication system according to the embodiment of the present invention.

Referring to FIG. 11, the SS demodulates a received preamble signal to subcarrier values by FFT and multiplies the subcarrier values by the preamble codes of known neighbor cells in step 1101. Under the afore-mentioned assumption, as many sequences of length 432 as the number N of the neighbor cells can be obtained. The SS calculates the differential correlation between two adjacent subcarriers over all cases in each of the sequences, and sums the differential correlations, thus producing correlations for the neighbor cells. The SS arranges the correlations in a descending order.

The SS sets a variable n indicating the index of a neighbor cell in step 1103. In step 1105, the SS calculates n$_{max}$ correlations by performing an n$^{th}$-order differential correlation ($1 \leq n \leq n_{max}$) on the preamble code-multiplied value of an n$^{th}$ cell, and complex-conjugates the n$_{max}$ correlations, resulting in 2× n$_{max}$ correlations. Each of the n$^{th}$-order correlations is the sum of the correlations between all pairs of subcarriers spaced by n, containing a phase rotation component as large as a timing offset generated on the downlink. component as large as a timing offset generated on the downlink.

In step 1107, the SS performs a J-point IFFT on the 2× n$_{max}$ correlations together with zero-padded IFFT inputs to which the correlations are not mapped. n$_{max}$ is roughly set according to the coherence bandwidth of a channel and it must be less than J/2. The IFFT size, J is a system operation parameter. The resulting IFFT signal is a sinc function, and characteristically has a shifted maximum value due to the timing offset generated on the downlink.

Thus, the SS detects a maximum value from the IFFT signal and calculates a timing offset using an IFFT output index having the maximum value in step 1109. In step 1111, the SS stores the timing offset and corresponding cell information (IDcell,s) in the handoff list table.

The SS compares the variable n with N in step 1113. If n is equal to or greater than N, this algorithm ends. If n is less than N, the SS increases the variable n by 1 in step 1115 and returns to step 1105. The timing offsets of the N neighbor cells are acquired by performing step 1105 through step 1111 N times. Meanwhile, the timings of the neighbor cells are periodically estimated by performing the algorithm in order to ensure reliable handoff.

Tracking the synchronization of the home cell will be described now.

Figure 12:
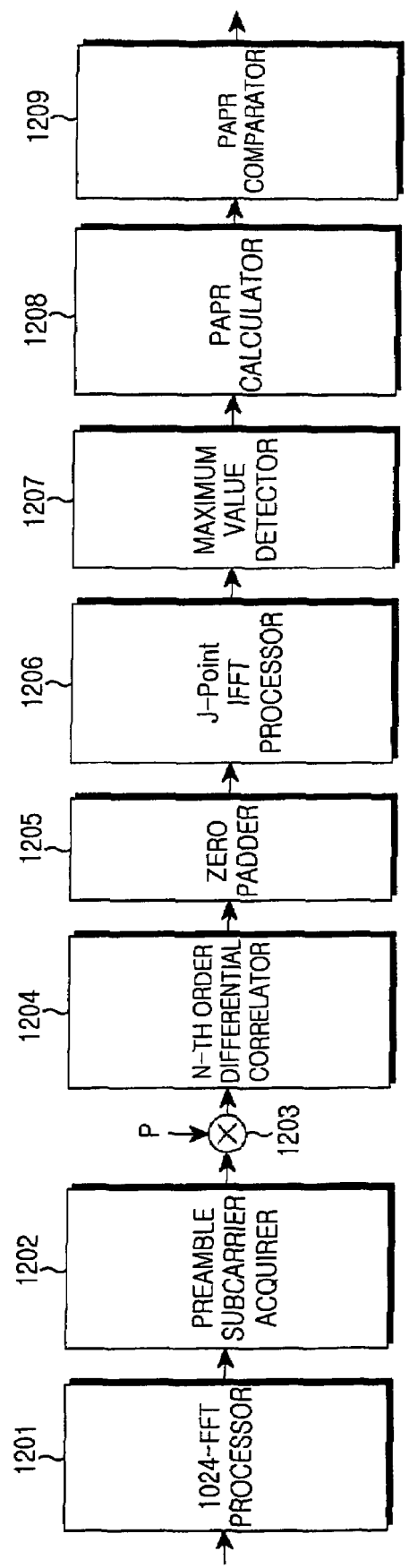
FIG. 12 is a block diagram of a synchronization tracking apparatus for the SS in the TDD-OFDMA communication system according to an embodiment of the present invention.

FIG. 12 is a block diagram of a synchronization tracking apparatus for the SS in the TDD-OFDMA communication system according to an embodiment of the present invention.

The synchronization tracking apparatus of the present invention includes an FFT processor 1201, a preamble subcarrier acquirer 1202, a multiplier 1203, an $N^{th}$-order differential correlator 1204, a zero padder 1205, a J-point IFFT processor 1206, a maximum value detector 1207, a PAPR calculator 1208, and a PAPR comparator 1209.

Referring to FIG. 12, the FFT processor 1201 FFT-processes a received preamble signal, that is, demodulates the received preamble signal to subcarrier values. The preamble subcarrier acquirer 1202 acquires subcarrier values having a preamble code among the subcarrier values. The multiplier 1203 multiplies the acquired subcarriers by the preamble code P of the home cell.

The $N^{th}$-order differential correlator 1204 produces $n_{max}$ correlations by performing an $n^{th}$-order correlation on the preamble code-multiplied value, and outputs the $n_{max}$ correlations and their complex conjugates. Here, $1$ n $n_{max}$. Each of the correlations $Z_n$ from the $N^{th}$-order differential correlator 1204 is the sum of the differential correlations between all pairs of subcarriers spaced by n, containing a phase rotation component as large as the timing offset generated on the downlink. The operation of the $N^{th}$-order differential correlator 1204 is modeled as Equation (15):

$$Z_n = \begin{cases} \sum_{j=0}^{W-1-n} Y_{IDcell,s}(k_j) \cdot Y^*_{IDcell,s}(k_{j+n}), & 1 \le n \le n_{\max} \\ Z^*_{J-n}, & J - n_{\max} \le n < J \end{cases} \quad (15)$$

where n denotes a J-point IFFT input index. $n_{max}$ is set according to the coherence bandwidth of the channel and must be less than J/2.

The zero padder 1205 provides the $2 \times n_{max}$ correlations to corresponding inputs of the J-point IFFT 1206, while padding zeroes at IFFT inputs to which the correlations are not mapped. For $n_{max}=24$, subcarrier positions $Z_n$ padded with zeroes are determined by Equation (10).

The J-point IFFT processor 1206 IFFT-processes the signal received form the zero padder 1205 and outputs a time-domain IFFT signal. According to the present invention, the IFFT size J can be selected. J can be $J \in \{2^3, 2^4, 2^5, \ldots, N_{FFT}\}$ As illustrated in FIG. 14, the inputs of a J-point IFFT processor according to the present invention are $\{Z_0, Z_1, \ldots, Z_{J/2-1}, Z_{J/2}, Z_{J/2+1}, \ldots, Z_{J-2}, Z_{J-1}\}$. The IFFT signal is the square of a sinc function in accordance with the waveform of the IFFT input signal $Z_n$, and characteristically has a shifted maximum value due to the timing offset generated on the downlink.

Therefore, the maximum value detector 1207 detects a maximum value from the IFFT signal (sinc function) and calculates a timing offset using an IFFT output index having the maximum value. The J-point IFFT processor 1206 and the maximum value detector 1207 operate according to Equation (11).

To verify the timing offset from the maximum value detector 1207, the PAPR calculator 1208 calculates a PAPR by Equation (12). The PAPR comparator 1209 compares the PAPR with a threshold. If the PAPR is equal to or greater than the threshold, the timing offset is decided as a final estimate.

Figure 13:
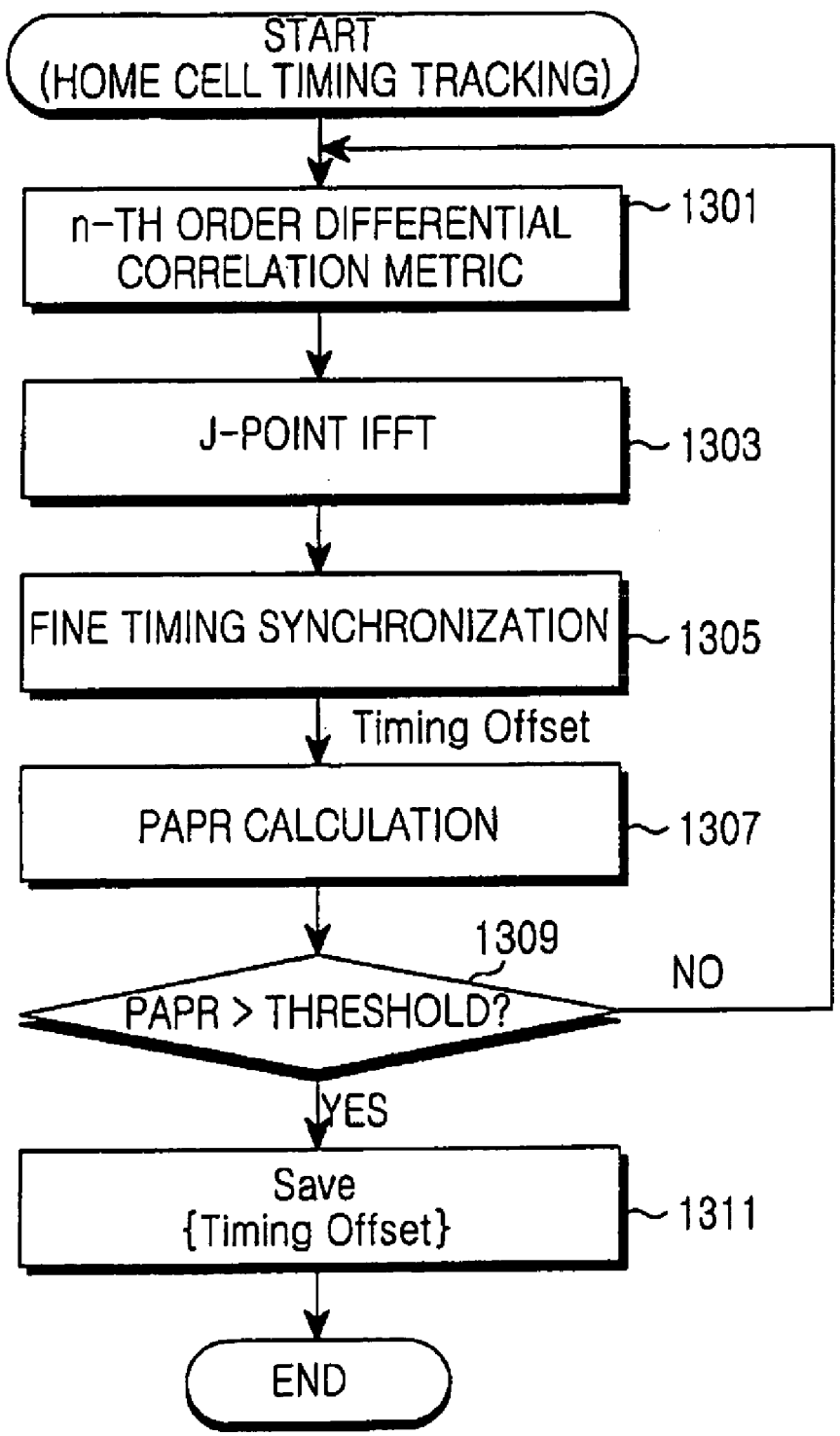
FIG. 13 is a flowchart illustrating a synchronization tracking procedure for the SS in the TDD-OFDMA communication system according to the embodiment of the present invention.

FIG. 13 is a flowchart illustrating a synchronization tracking procedure for the SS in the TDD-OFDMA communication system according to the embodiment of the present invention.

Referring to FIG. 13, the SS demodulates a received preamble signal to subcarrier values by FFT and multiplies the subcarrier values by the preamble code of a home cell in step 1301. Under the afore-mentioned assumption, a performing an $n^{th}$-order differential correlation ($1 \le n \le n_{max}$) on the preamble code-multiplied value, and complex-conjugates the $n_{max}$ correlations, resulting in $2 \times n_{max}$ correlations. Each of the $n^{th}$-order correlations is the sum of the correlations between all pairs of subcarriers spaced by n, containing a phase rotation component as large as a timing offset generated on the downlink.

In step 1303, the SS performs a J-point IFFT on the $2 \times n_{max}$ correlations together with IFFT inputs to which the correlations are not mapped. $n_{max}$ is roughly set according to the coherence bandwidth of a channel and it must be less than J/2. The IFFT size, J, is a system operation parameter. The resulting IFFT signal is a sinc function and characteristically has a shifted maximum value due to the timing offset generated on the downlink.

Therefore, the SS detects a maximum value from the IFFT signal and calculates a timing offset using an IFFT output index having the maximum value in step 1305. The SS calculates the PAPR of the IFFT signal in step 1307.

In step 1309, the SS compares the PAPR with a threshold. If the PAPR is less than or equal to the threshold, the SS returns to step 1301 to repeat the synchronization tracking. If the PAPR is greater than the threshold, the SS sets the temporary timing offset acquired in step 1305 as a final timing offset in step 1311. The synchronization tracking is periodically carried out for the home cell using the algorithm.

As described above, the initial cell search apparatus illustrated in FIG. 8, the neighbor cell search apparatus illustrated in FIG. 10, and the synchronization tracking apparatus illustrated in FIG. 12 are similar in configuration. In real implementation, thus, only the apparatus illustrated in FIG. 8 is configured to perform all of the initial cell search, neighbor cell search, and synchronization tracking. That is, the present invention performs the initial cell search, neighbor tracking. That is, the present invention performs the initial cell search, neighbor cell search, and synchronization tracking by use of a single apparatus.

Compared to the conventional technology, the cell search and synchronization tracking according to the present invention require a far less computation volume. A comparison in computation volume or complex between the present invention and the conventional technology is given in Table 3 below.

TABLE 3

| | | FFT Reception (Radi × 2FFT) | Code Multiplication & Diff. Demod. | Phase Scan | Additional Diff. Demod. | J-point IFFT (256) | Total computation |
|---|---|---|---|---|---|---|---|
| Initial connection | C | $N_{FFT}\log_2 N_{FFT}$ | $2 \times N_{Code} \times$ Code SIze $\times$ (Code Size-1) | 2×Code SIze×Search Range | | | 379237120 |
| | P | $N_{FFT}\log_2 N_{FFT}$ | $2 \times N_{Code} \times$ Code SIze $\times$ (Code Size-1) | | $2 \times \sum_{n=2}^{n_{max}} (432-n)$ | $J\log_2 J$ | 378373706 (99.78%) |
| HO | C | $N_{FFT}\log_2 N_{FFT}$ | $2 \times N_{list} \times$ Code SIze $\times$ (Code Size-1) | 2×Code SIze×Search Range | | | 3874048 |
| | P | $N_{FFT}\log_2 N_{FFT}$ | $2 \times N_{list} \times$ Code SIze $\times$ (Code Size-1) | | $2 \times \sum_{n=2}^{n_{max}} (432-n)$ | $J\log_2 J$ | 3012360 (77.76%) |
| Home Cell synchronization tracking | C | $N_{FFT}\log_2 N_{FFT}$ | 2×Code SIze×(Code Size-1) | 2×Code SIze×Search Range | | | 1267360 |
| | P | $N_{FFT}\log_2 N_{FFT}$ | 2×Code SIze×(Code Size-1) | | $2 \times \sum_{n=2}^{n_{max}} (432-n)$ | $J\log_2 J$ | 405672 (32.01%) |

C: conventional technology, P: present invention
$N_{FFT}$: FFT size = 1204
$N_{Code}$: the number of preamble codes = 127×8
Code Size: the length of a preamble code sequence = 432
Search Range: time error range to be estimated = 1204
$N_{list}$: the number of handoff candidates = 8
$n_{max}$: the number of differential correlation operations performed = 24
J: IFFT size = 256
HO = handoff As noted from Table 3, an initial cell search requires almost the same computation volume in both the conventional technology and the present invention. The computation volume required for a neighbor cell search for handoff in the present invention is 77.76% of that in the conventional technology, an about 22% decrease. Furthermore, as to the computation requirement for synchronization tracking, the present invention is no more than 32.01% of the conventional technology.

In accordance with the present invention as described above, implementation complexity is remarkably reduced because cell search and synchronization acquisition can be implemented by use of a single apparatus. As noted from Table 3, the computation requirement is also significantly decreased compared to the conventional technology. The synchronization acquisition is performed such that a correlation decrease caused by the timing offset between subcarriers on the frequency axis is eliminated. Therefore, timing synchronization is correctly detected. In addition, the detected timing synchronization is verified using a PAPR, leading to more reliable timing synchronization.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A subscriber station (SS) apparatus in a broadband wireless communication system, comprising:
    a preamble subcarrier acquirer for extracting subcarrier values having a preamble code from a fast Fourier transform (FFT) signal;
    a multiplier for code-demodulating the subcarrier values by multiplying the subcarrier values by a preamble code;
    a correlator for calculating $n^{th}$-order differential correlations by calculating a correlation between two subcarrier values spaced by n over all cases in a code-demodulated signal and summing the calculated correlations, where $1 \leq n \leq n_{max}$;
    an inverse fast Fourier transform (IFFT) processor for IFFT-processing the $n^{th}$-order differential correlations from the correlator and outputting an IFFT signal; and
    a maximum value detector for detecting a maximum value from the IFFT signal and calculating a timing offset using an IFFT output index having the maximum value;
    wherein if n is a J-point IFFT input index, . . . differential correlations $(Z_n)$ by $Z_n = \ldots$ 2. The SS apparatus of claim 1, further comprising:
    a peak-to-average power ratio (PAPR) calculator for calculating the PAPR of the IFFT signal; and
    a comparator for comparing the PAPR with a threshold and setting the calculated timing offset as a timing offset estimate if the PAPR is greater than the threshold.

3. The SS apparatus of claim 1, wherein zeros are padded at subcarriers to which the differential correlations are not mapped.

4. The SS apparatus of claim 1, wherein for an initial cell search, the multiplier multiplies the subcarrier values by the preamble codes of all cells and outputs a plurality of code-demodulated signals.

5. The SS apparatus of claim 4, further comprising:
    a first-order differential correlator for calculating a correlation between two adjacent subcarriers over all the cases in each of the code-demodulated signals, summing the correlations as a differential correlation for each of the code-demodulated signals, and outputting a plurality of differential correlations for the code-demodulated signals; and a detector for detecting a highest of the differential correlations and acquiring a cell having the highest correlation.

6. The SS apparatus of claim 1, wherein for a neighbor cell search for handoff, the multiplier multiplies the subcarrier values by the preamble codes of known neighbor cells and outputs a plurality of code-demodulated signals.

7. The SS apparatus of claim 6, further comprising:
a first-order differential correlator for calculating a correlation between two adjacent subcarriers over all the cases in each of the code-demodulated signals, summing the correlations as a differential correlation for each of the code-demodulated signals, and outputting a plurality of differential correlations for the code-demodulated signals; and
an arranger for prioritizing the neighbor cells as handoff target cells by arranging the differential correlations in a predetermined order.

8. The SS apparatus of claim 1, wherein $n_{max}$ is determined according to the coherence bandwidth of a channel and is less than a half of an IFFT size of the IFFT processor.

9. The SS apparatus of claim 1, wherein if k is the IFFT output index having the maximum value, DR (Decimation Ratio) is $N_{FFT}/J$, and d is the spacing between two adjacent subcarriers, the maximum value detector calculates the timing offset ($\Delta t_{offset}$) by $$\Delta t_{offset} = \begin{cases} DR \times k \times \frac{1}{d}, & \text{if } k \leq \frac{j}{2} \\ DR \times k \times \frac{1}{d} - N_{FFT}, & \text{if } k > \frac{j}{2} \end{cases}.$$

10. The SS apparatus of claim 1, wherein the IFFT signal is a sinc function.

11. A receiving method for a subscriber station (SS) in a broadband wireless communication system, comprising the steps of:
acquiring subcarrier values having a preamble code from a fast Fourier transform (FFT) signal;
code-demodulating the subcarrier values by multiplying the subcarrier values by a preamble code;
calculating $n^{th}$-order differential correlations by calculating a correlation between two subcarrier values spaced by n over all cases in a code-demodulated signal and summing the calculated correlations, where $1 \leq n \leq n_{max}$;
inverse fast Fourier transform (IFFT)-processing the $n^{th}$-order differential correlations and outputting an IFFT signal; and
detecting a maximum value from the IFFT signal and calculating a timing offset using an IFFT output index having the maximum value; wherein if n is a J-point IFFT input index, $K_j$ is the index ... differential correlations ($Z_n$) by $Z_n = $ . . . .

12. The receiving method of claim 11, further comprising the steps of:
calculating the peak-to-average power ratio (PAPR) of the IFFT signal; and
verifying the calculated timing offset by comparing the PAPR with a threshold.

13. The receiving method of claim 11, further comprising the step of padding zeros at subcarriers to which the differential correlations are not mapped.

14. The receiving method of claim 11, wherein $n_{max}$ is determined according to the coherence bandwidth of a channel and is less than a half of an IFFT size.

15. The receiving method of claim 11, wherein if k is the IFFT output index having the maximum value, DR (Decimation Ratio) is $N_{FFT}/J$, and d is the spacing between two adjacent subcarriers, the timing offset calculation step comprises the step of calculating the timing offset ($\Delta t_{offset}$) by $$\Delta t_{offset} = \begin{cases} DR \times k \times \frac{1}{d}, & \text{if } k \leq \frac{j}{2} \\ DR \times k \times \frac{1}{d} - N_{FFT}, & \text{if } k > \frac{j}{2} \end{cases}.$$

16. An initial cell search method in a broadband wireless communication system, comprising the steps of:
performing a first-order differential correlation on each of signals demodulated with all possible preamble codes and acquiring a cell having the highest first-order correlation, at an initial cell search;
calculating $n^{th}$-order differential correlations by calculating a correlation between two subcarrier values spaced by n over all cases in a code-demodulated signal of the acquired cell, where $1 \leq n \leq n_{max}$;
summing the calculated correlations;
inverse fast Fourier transform (IFFT)-processing the $n^{th}$-order differential correlations and outputting an IFFT signal; and
detecting a maximum value from the IFFT signal and calculating a timing offset using an IFFT output index having the maximum value; wherein if n is a J-point IFFT input index, $K_j$ is the index ... differential correlations ($Z_n$) by $Z_n = $ . . . .

17. The initial cell search method of claim 16, further comprising the steps of:
calculating the peak-to-average power ratio (PAPR) of the IFFT signal; and
verifying the calculated timing offset by comparing the PAPR with a threshold.

18. A handoff target cell search method in a broadband wireless communication system, comprising the steps of:
performing a first-order differential correlation on each of signals demodulated with the preamble codes of known neighbor cells and ordering the neighbor cells according to the first-order differential correlations, at a handoff target cell search;
calculating $n^{th}$-order differential correlations by calculating a correlation between two subcarrier values spaced by n over all cases on a code-demodulated signal and summing the calculated correlations, for each of the neighbor cells, where $1 \leq n \leq n_{max}$;
inverse fast Fourier transform (IFFT)-processing the $n^{th}$-order differential correlations for each neighbor cell and outputting an IFFT signal for the each neighbor cell; and
detecting a maximum value from the IFFT signal of each neighbor cell and calculating a timing offset for each neighbor cell using an IFFT output index having the maximum value; wherein if n is a J-point IFFT input index, $K_j$ is the index ... differential correlations ($Z_n$) by $Z_n = $ . . . .

19. The handoff target cell search method of claim 18, further comprising the step of writing the timing offset of the each neighbor cell in a handoff list.

20. The SS apparatus of claim 1, wherein the correlator outputs the $n_{max}$ differential correlations and complex conjugates of the $n_{max}$ differential correlations.

* * * * *